United States Patent [19]

Stiles

[11] Patent Number: 5,513,330
[45] Date of Patent: Apr. 30, 1996

[54] APPARATUS FOR SUPERSCALAR INSTRUCTION PREDECODING USING CACHED INSTRUCTION LENGTHS

[75] Inventor: David R. Stiles, Sunnyvale, Calif.

[73] Assignee: NexGen, Inc., Milpitas, Calif.

[21] Appl. No.: 143,549

[22] Filed: Oct. 27, 1993

Related U.S. Application Data

[63] Continuation of Ser. No. 594,878, Oct. 9, 1990, abandoned.

[51] Int. Cl.$^6$ ..................................................... G06F 9/38
[52] U.S. Cl. ..................... 395/375; 395/800; 364/231.8; 364/261.3; 364/262.4; 364/DIG. 1
[58] Field of Search ..................................... 395/800, 775, 395/435, 400, 375; 364/131–134

[56] References Cited

U.S. PATENT DOCUMENTS

| | | | |
|---|---|---|---|
| 4,853,840 | 8/1989 | Shibuya | 395/375 |
| 4,858,104 | 8/1989 | Matsuo et al. | 395/375 |
| 4,860,197 | 8/1989 | Langendorf | 395/375 |
| 4,894,772 | 1/1990 | Langendorf | 395/375 |
| 4,926,323 | 5/1990 | Baror et al. | 395/375 |
| 4,942,520 | 7/1990 | Langendorf | 395/425 |

Primary Examiner—Alyssa H. Bowler
Assistant Examiner—Alpesh M. Shah
Attorney, Agent, or Firm—Townsend and Townsend and Crew

[57] ABSTRACT

A method and apparatus for eliminating the delay in a parallel processing pipeline. In a parallel processing pipeline system, a circuitry is provided to determine the length and align two instructions in parallel. Parallel decoding circuitry is provided for decoding and executing the two instructions. A branch prediction cache stores the target instruction and next sequential instruction, and is tagged by the address of the branch instruction, as in the prior art. In addition, however, the branch prediction cache also stores the length of the first and second instructions and the address of the second instruction. This additional data allows the target and next sequential instructions to be directly aligned and presented to the parallel decoding circuits without waiting for a calculation of their lengths and starting addresses.

3 Claims, 5 Drawing Sheets

APPARATUS FOR SUPERSCALAR INSTRUCTION PREDECODING USING CACHED INSTRUCTION LENGTHS

This is a continuation of application Ser. No. 07/594,878, filed Oct. 9, 1990, now abandoned.

BACKGROUND

The present invention relates to the parallel decoding of multiple instructions, and in particular to the use of a branch prediction cache in connection with such parallel decoding.

A typical processing circuit will fetch a next instruction block from memory in order to execute the next instruction in a program. Since instructions may vary in length, a block of instructions is typically fetched into an instruction buffer which is larger than the largest instruction length. It will then be necessary for the processor to determine which of the bits in the fetched block belong to the instruction. In other words, the instruction length must be determined. If the instruction is short enough so that the second sequential instruction is also within the same block, its length must also be determined, as well as the starting bit for that instruction. The second instruction must then be aligned before being presented to decoding logic for actually executing the instruction.

The instruction is examined, and if it is a jump or branch, the processor will go ahead and fetch the instruction branched too. This will typically be done even before it is determined if the branch is to be taken, so as to reduce the delay. This involves fetching an instruction other than the next sequential instruction, so the instruction buffer must be reloaded. Often, a branch target cache is used for this purpose. The cache will store the instructions branched to (the target instructions) for the most recently executed branches.

One way to increase the processing speed is to decode two instructions in parallel. Thus, the lengths of the two instructions and their starting addresses must be determined and then the instructions can be separated and aligned for decoding with parallel decoding circuitry. A problem arises when branch instructions are encountered, since the branch will cause a delay or bubble in the pipeline between the instruction buffer and the decoding circuitry. This delay is caused by the need to determine the length of the target instruction and align the next sequential instruction after the target instruction.

SUMMARY OF THE INVENTION

The present invention provides a method and apparatus for eliminating the delay in a parallel processing pipeline when encountering branch instructions. Circuitry is provided to determine the length and align two instructions in parallel. Parallel decoding circuitry is provided for decoding and executing the two instructions. A branch prediction cache stores the target instruction and next sequential instruction, and is tagged by the address of the branch instruction, as in the prior art. In addition, however, the branch prediction cache also stores the length of the first and second instructions. This additional data allows the target and next sequential instructions to be directly aligned and presented to the parallel decoding circuits without waiting for a calculation of their lengths and starting addresses.

The present invention preferably also provides the address of the second sequential target instruction and the type of operation (P-OP TYPE) of the instruction for use by hold logic in the processor.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
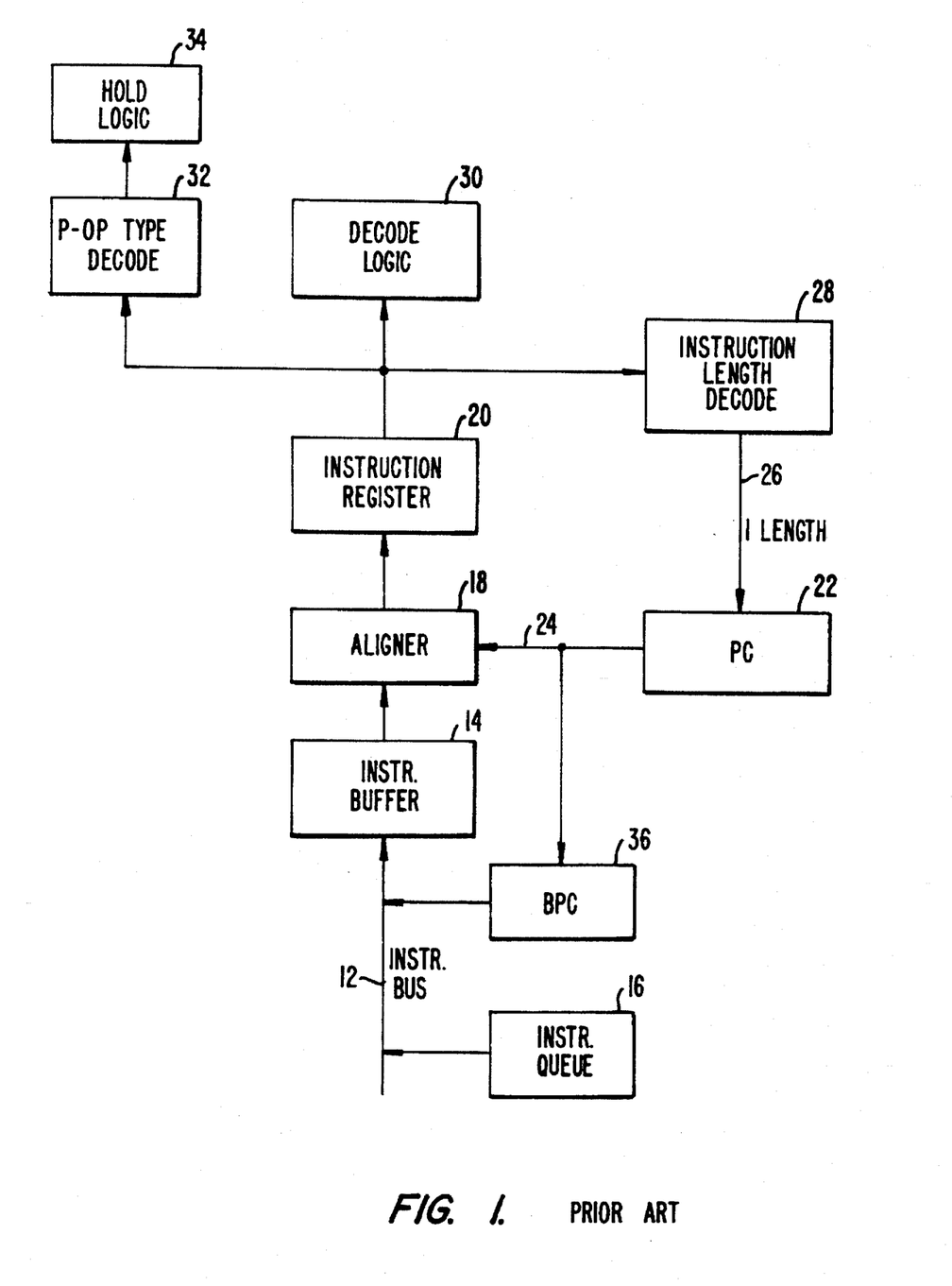
FIG. 1 is a block diagram of the pre-processing portion of a processor according to the prior art.

FIG. 1 is a block diagram of the pre-processing portion of a prior art processor. An instruction bus 12 provides a block of instructions to an instruction buffer 14. These instructions will typically come from an instruction queue 16. The instructions are provided to an aligner 18 with the next instruction itself provided to an instruction register 20. A program counter 22 provides the address of the next instruction on a bus 24. This address is calculated from the previous address by the addition of the instruction length of the previous instruction provided on a bus 26 from an instruction length decode circuit 28. The instruction length decode circuit is provided its input from instruction register 20.

The output of instruction register 20 is provided to decoding logic 30 for performing the decoding for execution of the instruction. At the same time, the instruction is provided to a P-OP type decode circuit 32 which determines the type of instruction present. The output of this P-OP type decode circuit is provided to hold logic 34. The hold logic will hold up execution of the instruction when data dependencies or hardware resource constraints require that the pipeline be stalled for one or more clock cycles.

The decoded PC (Program Counter) of program counter 22 (the address of the next instruction) is provided at the start of a new instruction cycle. During a single cycle, the PC value is used to index into instruction buffer 14, the instruction is aligned in aligner 18 and provided to register 20 for determination of instruction length. During the same single cycle, the PC is used to perform a directory lookup in the branch prediction cache (BPC) 36. If there is a branch as determined by P-OP decode block 32 which is predicted to be taken, and if the BPC lookup is successful, then the BPC will provide a block of target instruction data to replace the sequential data previously stored in the instruction buffer. At this point, the process will start over again for the next instruction.

Figure 2:
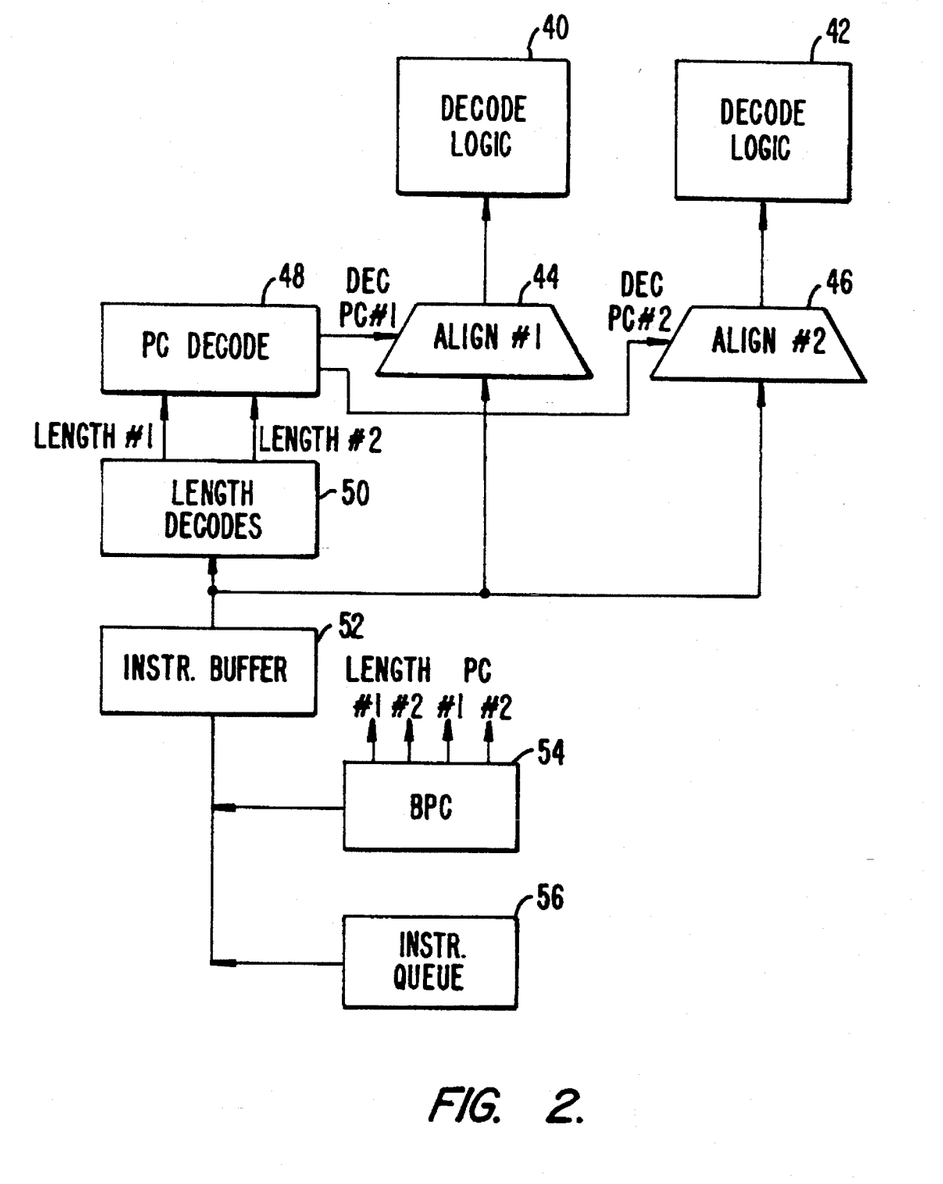
FIG. 2 is a block diagram of an embodiment of the present invention showing the parallel instruction length decodes and alignment logic.

FIG. 2 is an overall block diagram of an embodiment of the present invention with parallel decoding of two instructions in one cycle. Parallel decode logic blocks 40 and 42 are provided for this purpose. Separate alignment circuits 44 and 46 are required, rather than the single aligner of FIG. 1. A decoded PC (instruction address) for each of the instructions is required for the aligners. Thus, the alignment cannot be performed until the PC for both the first and second instruction are determined in PC decode block 48. This in turn requires that the lengths of both the first and second instruction be first determined in a length decoder 50. As will be appreciated, these requirements lengthen the amount of time before the alignment can be done. But this longer decode time is handled by using the more heavily pipelined implementation set forth in this application, without requiring the clock rate to be decreased. Since two instruction decodes are done in parallel, the throughput is effectively doubled.

FIG. 2 also includes an instruction buffer 52 as in the system of FIG. 1, along with the branch prediction cache 54 and an instruction queue 56. The BPC additionally provides the length and PC for the target and next target instruction. In the event there is a hit in the BPC, the instructions can be provided directly to alignment circuits 44 and 46 without waiting for decoding of the length and PC again in blocks 50 and 48. The decoded PCs from PC decoder 48 are provided to the BPC 54 at the same time they are provided to alignment circuits 44 and 46. Thus, if there is a hit in the BPC, an extra time "bubble" would result from the need to recalculate the length and the PC for the two instructions. In this invention, the length and the PC for the two instructions are stored in the BPC. This eliminates the time bubble because the length and PC are immediately available.

Figure 3:
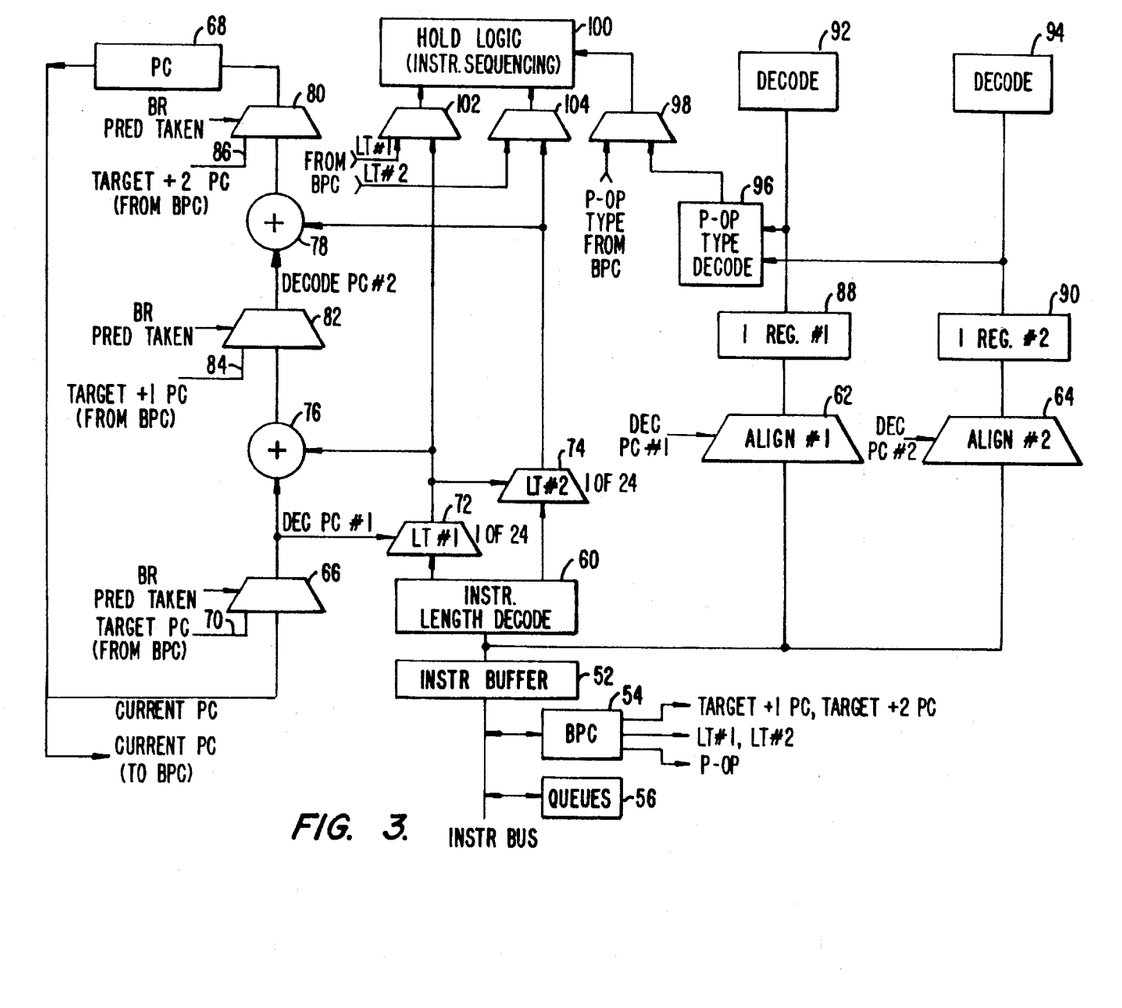
FIG. 3 is a more detailed diagram of the embodiment of FIG. 2.

FIG. 3 is a more detailed block diagram of the embodiment of FIG. 2. Instructions in an instruction buffer 52 are provided from the branch prediction cache 54 or the instruction queues 56. The contents of the instruction buffer 52 are provided to an instruction length decode circuit 60 and to first and second aligners 62 and 64. Each of the alignment circuits need as an input the starting address of its instruction (DEC.PC). The decoded PC for the first instruction is provided from the output of multiplexer 66 from a program counter register 68. Alternately, if the previous instruction was a branch, the target address or target PC is provided on line 70 through MUX 66. This DEC.PC #1 is also provided to length circuit 72 for selecting the length of a first next instruction from instruction length decode circuit 60. The length of the second next instruction is selected by a circuit 74 using the output of length circuit 72.

The DEC.PC needed for the second alignment circuit 64 is generated by an addition circuit 76 which adds decode PC number 1 and the length from length circuit 72. This decode PC value is combined with the length of the second instruction from circuit 74 in an addition circuit 78 to provide the starting address of the next instruction (#2) through a multiplexer 80 to PC register 68.

A multiplexer 82 is used to alternately select the PC of the instruction following the target instruction (target +1) on a line 84 in the event a branch is taken. (The notation "target+n", where n is an integer, is a shorthand notation for the n-th sequential instruction following the target instruction.) Similarly, an input 86 to multiplexer 80 provides the PC of the second instruction after the target instruction to PC 68 when a branch is taken. The values on lines 70, 84 and 86 of the PCs for the target, target +1 and +2 PCs are provided from BPC 54. The current PC from PC register 68 is provided to BPC 54 to index into the appropriate target when there is a branch.

Once the decode PCs for the first and second instruction are determined, they are provided to alignment circuits 62 and 64. These circuits then provide the aligned instructions to instruction registers 88 and 90, respectively. These instructions are then provided to decode circuits 92 and 94 for complete decode and execution in parallel.

A P-OP type decode circuit 96 determines the type of the instruction which will indicate, among other things, whether a branch has to be taken. A signal is provided through a multiplexer 98 to a hold logic 100. This hold logic will hold up execution of an instruction when data dependencies or hardware resource constraints require that the pipeline be stalled for one or more clock cycles. Hold logic 100 also receives inputs from multiplexers 102 and 104 providing the instruction lengths from either length circuit 72 and 74 or directly from BPC 54.

As can be seen, BPC 54 must provide a number of elements and information to avoid delays in the pipeline. These delays would result from requiring reprocessing to redetermine lengths and PCs.

Figure 4:
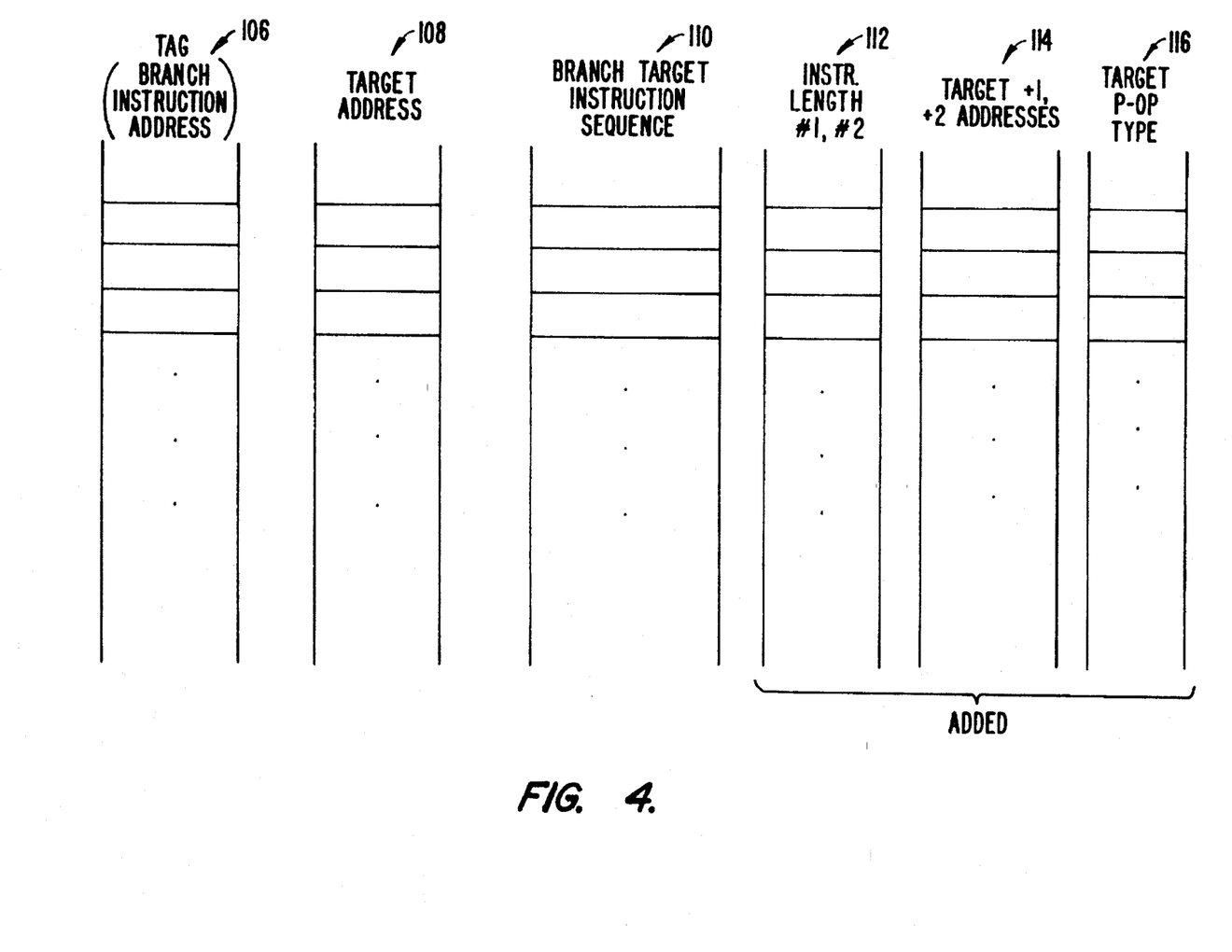
FIG. 4 is a diagram of the information stored in the branch prediction cache of FIG. 2.

FIG. 4 is a diagram showing the contents of the BPC. A first column 106 stores the tag or branch instruction address which indexes into the BPC. A second column 108 stores the address of the target instruction. A third column 110 stores a block of instructions starting at the branch target address. Column 112 stores the instruction length for the first and second instructions in the sequence in column 110. Column 114 stores the address of the first and second instructions following the target instruction. Although these addresses could be calculated from the lengths in column 112 along with the target address in column 108, this will take additional time which would cause a bubble in the pipeline. Finally, the P-OP type of the target instruction is stored in column 116.

The BPC caches the instruction length for the target and target +1 instructions (3 bits each). In addition to the target address, the BPC caches the target +1 and target +2 DEC.PC addresses (32 bits each). Of course the DEC.PCs could be derived from the instruction lengths, but not fast enough to avoid the single pipeline bubble. We also cache the miscellaneous instruction type decodes. This is an additional 4 bits for each of two instructions.

The two DEC.PCs can be simplified by applying the following restriction: we take a penalty cycle if the two DEC.PC values do not lie on the same physical page as the target address. This allows us to cache two 12 bit DEC.PCs, with the upper 20 bits of each coming from the existing target address value. We can save a few more bits by further constraining the acceptable address ranges to something less than 4K byte, but performance loss goes as $O(2^{**}n)$ and bit savings goes as $O(2^*n)$.

The total is therefore about 38 addition RAM bits per BPC line to avoid a pipeline bubble on each transfer control which hits in the BPC and which is predicted taken.

In another embodiment we store the target address <31..0>, and the target address <11..4> plus 0000_0001. We then store a single bit for each of two instructions which indicates whether TA<11..4> or the incremented TA<11..4> should be used. We continue to store instruction length and the 4 LSBs of the DEC.PC. The total is then (2*3+8+2*4+ 2*3=28 bits).

The output of various elements of the columns of FIG. 4 are shown on the right side of BPC 54 in FIG. 3. The target address and the target +1 and target +2 addresses are provided on lines 70, 84 and 86 as inputs to multiplexer 66, 82 and 80. The lengths of the first and second target instructions shown as outputs from BPC 54 are provided as alternate inputs to multiplexers 102 and 104. By providing the target address or PC to multiplexers 66 and 82, they are selected and provided as inputs to alignment circuits 62 and 64. Finally, the P-OP type from the BPC is provided as an input to multiplexer 98.

Figure 5:
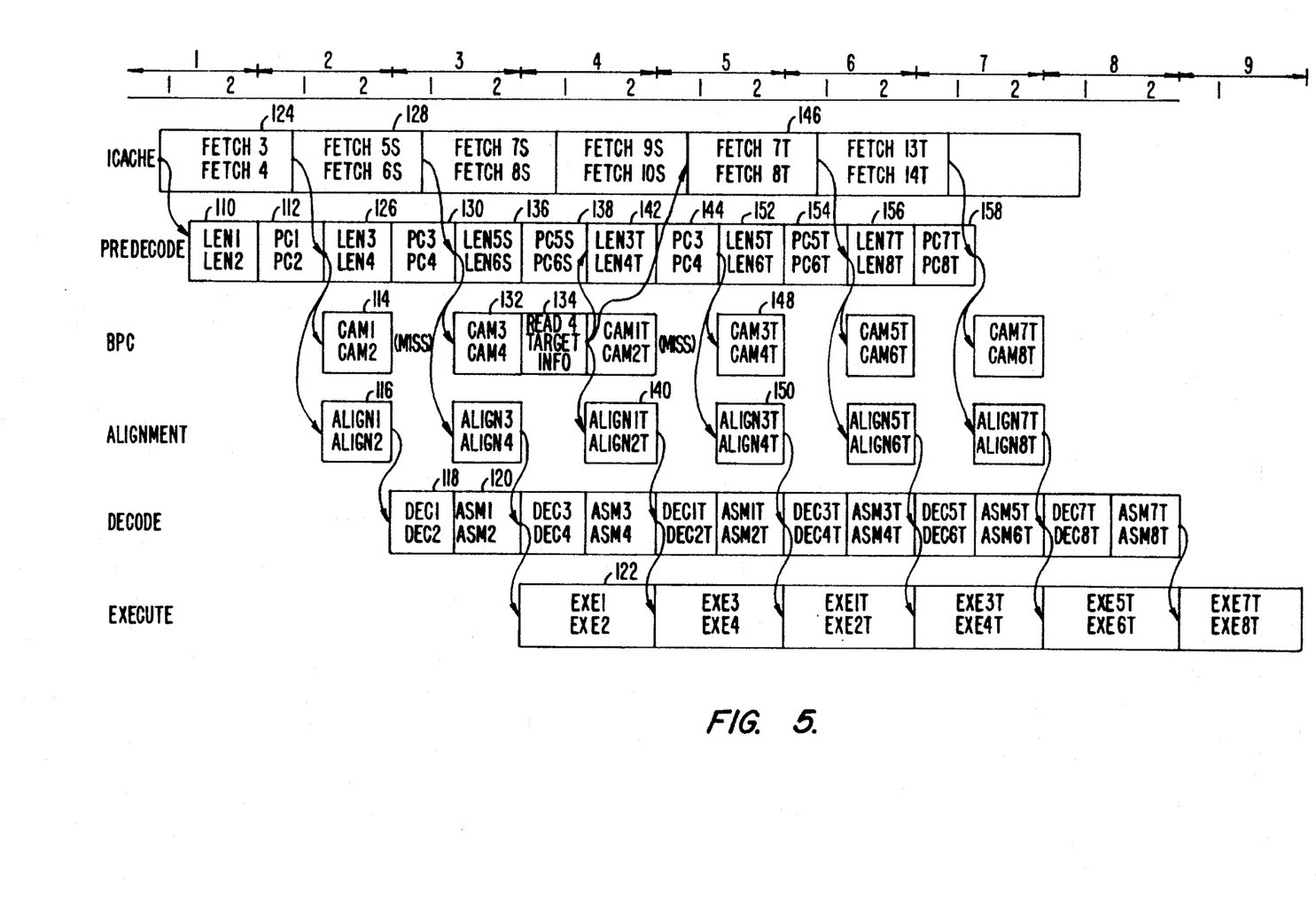
FIG. 5 is a timing diagram illustrating the operation of the embodiment of the invention shown in FIG. 2.

FIG. 5 shows the timing for an instruction sequence. An instruction branch is taken in cycle 4. The pipeline of the system is shown going downward, with the first event being the fetch from the instruction cache or queue 56 shown on the line labelled "I cache". Next is shown a "Pre-decode" line in which the length is calculated (e.g., "LEN1, LEN2") with length decode, circuits 60, 72 and 74. This is followed in time, on the same line, by the determination of the PC of the first and second instruction (e.g., "PC1, PC2"). The following line is labelled "BPC". The PC is used to index into the BPC to determine if there is a hit (e.g., "CAM1, CAM2"). At the same time, the alignment of the first and second instructions are done, as indicated by the following line labelled "Alignment". The next line labeled "Decode" is for the decoding which occurs after alignment, and the final line labeled "Execute" is for the actual execution of the instructions.

Following the particular example of the first and second instructions, these are fetched at the beginning of the cycle for cycle 1 and their lengths are calculated during the second half of cycle 1 as indicated by a box 110. The addresses of the instructions, or their PC, is then calculated at the beginning of cycle 2 as indicated by box 112. After these are calculated, in the second half of cycle 2 they are used to index into the branch prediction cache, as indicated by box 114 and they are also used for alignment of the instructions as shown by box 116. In the example shown, there is a miss indicated for the branch, indicating that there is no branch instruction. After the alignment, a box 118 indicates the decoding being done for both followed by a box 120 for the assembly of the instructions. This is followed by a box 122 for the actual execution of the instructions.

The example above shows the movement through the pipeline of the first and second instruction. As can be seen, while the length of the first and second instructions are being determined, the third and fourth instructions are being fetched as indicated by box 124. The length of the third and fourth instructions are calculated as indicated by a box 126 while the fifth and sixth instructions are being fetched (box 128) and also at the same time as the BPC is being indexed for instructions 1 and 2 (box 114) and the alignment of the first two instructions being done (box 116). The PCs for instructions 3 and 4 are calculated as indicated in the box 130 and the BPC is indexed for these instructions as indicated in the box 132.

In the example shown, instruction 4 is a branch which indexes into the BPC to provide a target instruction. The reading of this target information is indicated by box 134. At this point, the seventh and eighth and ninth and tenth instructions have already been fetched, and the length and PC of the fifth and sixth instructions have already been calculated (boxes 136 and 138). These values are then discarded since there is a jump to a target instruction. Since the BPC contains the length and PC information for the first two target instructions, a jump can immediately be made to the alignment for these first two target instructions (indicated 1T and 2T) in a box 140. Thus, there is no need to wait for the additional length and PC calculations. The length calculation for the next two target instructions, 3T and 4T, is immediately started as indicated by box 142, and is followed by the calculation of the PCs for the third and fourth target instructions as indicated by box 144. As can be seen, the third and fourth target instructions must be stored in the branch prediction cache as well to avoid a bubble in the pipeline since there is no time to fetch them. There is time to fetch the fifth and sixth target instructions as indicated by box 146, and this is activated upon the determination of a hit on the target instruction from box 134. At the same time as the fetch in box 146 is being done, the BPC is being checked in a box 148 for instructions 3T and 4T, while these instructions are also being provided to the alignment circuits indicated by a box 150.

To keep the pipeline going, the length of the fifth and sixth target instructions must be determined at a time indicated by box 152. Since the seventh and eighth instructions have only been started to be fetched at this time as indicated by box 146, the fifth and sixth instructions must be in the BPC to enable this length calculation. Otherwise, there will a bubble in the pipeline. The length calculation is followed by the PC calculation for the fifth and sixth target instructions as indicated by box 154. At that time, the normal fetch of the seventh and eighth target instructions as indicated by box 146 has been completed, and this information can be used to calculate the length and PC for the seventh and eighth instructions as indicated by boxes 156 and 158. At this point, the pipeline is back on track and no more information from the BPC is required.

As will be understood by those familiar with the art, the present invention may be embodied in other specific forms without departing from the spirit or essential characteristics thereof. For example, three or more instructions could be decoded in parallel. Accordingly, the disclosure of the preferred embodiment of the invention is intended to be illustrative, but not limiting, of the scope of the invention which is set forth in the following claims.

What is claimed is:

1. An instruction pre-decoding apparatus for a processor executing variable-length instructions fetched from a memory, each of said instructions executing in an integral multiple of a time unit referred to as an instruction cycle, said processor executing for a plurality of said instruction cycles, said apparatus pre-decoding at least two of said instructions during one of said instruction cycles, said instructions having respectively associated
lengths,
addresses, and
locations in said memory, said addresses respectively representing said locations in said memory, said instructions including branch instructions and target instructions, said target instructions being respectively associated with said branch instructions, said apparatus comprising:

a branch prediction cache having at least one entry, said at least one entry having fields for one of said target instructions, the length of said one of said target instructions, the length of a first sequential instruction following said one of said target instructions, the address of said one of said target instructions, the address of said first sequential instruction following said one of said target instructions, and the address of a second sequential instruction following said one of said target instructions;

means for determining the address or a first one of said instructions;

means for fetching from said memory during one or said instruction cycles at least said first one of said instructions and a second one of said instructions, said second one of said instructions sequentially following said first one of said instructions;

means for determining the respective lengths of said first and second ones of said instructions;

means for determining the address of said second one or said instructions;

means for determining whether either of said first and second ones of said instructions is one of said branch instructions and is thus a detected branch;

means for checking whether said at least one entry of said branch prediction cache is associated with said detected branch and is thus an associated entry;

means for substituting, said means for substituting receiving a first group of said fields from said associated entry, said first group of said fields including said one of said target instructions, said length of said one of said target instructions, and said address of said one of said target instructions, said means for substituting providing said first group of said fields as replacements respectively for said detected branch, said detected branch's determined length, and said detected branch's determined address;

a program counter register;

a first multiplexer having a first input coupled to an output of said program counter register and a second input for receiving said address of said one of said target instructions from said associated entry of said branch prediction cache;

first means for adding an output of said first multiplexer and said length of said first one of said instructions from said means for determining the respective lengths;

a second multiplexer having a first input coupled to an output of said first means for adding and a second input for receiving said address of said first sequential instruction following said one of said target instructions from said associated entry of said branch prediction cache;

second means for adding an output of said second multiplexer and said length of said second one of said instructions from said means for determining the respective lengths; and a third multiplexer having a first input coupled to an output of said second means for adding and a second input for receiving said address of said second sequential instruction following said one of said target instructions from said associated entry of said branch prediction cache, an output of said third multiplexer being coupled to an input of said program counter register.

2. The apparatus of claim 1 further comprising:

a first alignment circuit for aligning said first one of said instructions in response to an input of a first program count information from said output of said first multiplexer; and a second alignment circuit for aligning said second one of said instructions in response to an input of a second program count information from said output of said second multiplexer.

3. An instruction pre-decoding apparatus for a processor executing variable-length instructions fetched from a memory, each of said instructions executing in an integral multiple of a time unit referred to as an instruction cycle said processor executing for a plurality of said instruction cycles, said apparatus pre-decoding at least two of said instructions during one of said instruction cycles, said instructions having respectively associated
lengths,
addresses, and
locations in said memory.

said addresses respectively representing said locations in said memory, said instructions including branch instructions and target instructions, said target instructions being respectively associated with said branch instructions, said apparatus comprising:

a branch prediction cache having at least one entry said at least one entry having fields for one of said target instructions, the length of said one of said target instructions, the length of a first sequential instruction following said one of said target instructions, the address of said one of said target instructions, the address of said first sequential instruction following said one of said target instructions, and the address of a second sequential instruction following said one of said target instructions;

means for determining the address of a first one of said instructions;

means for fetching from said memory during one of said instruction cycles at least said first one of said instructions and a second one of said instructions, said second one of said instructions sequentially following said first one of said instructions;

means for determining the respective lengths of said first and second ones of said instructions;

means for determining the address of said second one of said instructions;

means for determining whether either of said first and second ones of said instructions is one of said branch instructions and is thus a detected branch;

means for checking whether said at least one entry of said branch prediction cache is associated with said detected branch and is thus an associated entry;

means for substituting, said means for substituting receiving a first group of said fields from said associated entry, said first group of said fields including said one of said target instructions, said length of said one of said target instructions, and said address of said one of said target instructions, said means for substituting providing said first group of said fields as replacements respectively for said detected branch, said detected branch's determined length, and said detected branch's determined address;

a program counter register;

a first multiplexer having a first input coupled to an output of said program counter register and a second input for receiving said address of said one of said target instructions from said associated entry of said branch prediction cache;

first means for adding an output of said first multiplexer and said length of said first one of said instructions from said means for determining the respective lengths;

a second multiplexer having a first input coupled to an output of said first means for adding and a second input for receiving said address of said first sequential instruction following said one of said target instructions from said associated entry of said branch prediction cache;

second means for adding an output of said second multiplexer and said length of said second one of said instructions from said means for determining the respective lengths;

a third multiplexer having a first input coupled to an output of said second means for adding and a second input for receiving said address of said second sequential instruction following said one of said target instructions from said associated entry of said branch prediction cache, an output of said third multiplexer being coupled to an input of said program counter register;

a first alignment circuit for aligning said first one of said instructions in response to an input of a first program count information from said output of said first multiplexer; and a second alignment circuit for aligning said second one of said instructions in response to an input of a second program count information from said output of said second multiplexer.

* * * * *